(12) United States Patent
Jenks et al.

(10) Patent No.: US 6,532,148 B2
(45) Date of Patent: Mar. 11, 2003

(54) MECHANISM FOR ATTACHING ACCESSORY DEVICES TO HANDHELD COMPUTERS

(75) Inventors: Kenneth A. Jenks, Capitola, CA (US); Troy Hulick, Saratoga, CA (US)

(73) Assignee: Palm, Inc., Santa Clara, CA (US)

( * ) Notice: Subject to any disclaimer, the term of this patent is extended or adjusted under 35 U.S.C. 154(b) by 68 days.

(21) Appl. No.: 09/738,283

(22) Filed: Dec. 14, 2000

(65) Prior Publication Data

US 2001/0036058 A1 Nov. 1, 2001

Related U.S. Application Data

(63) Continuation-in-part of application No. 09/502,169, filed on Feb. 11, 2000, now Pat. No. 6,266,240, which is a continuation-in-part of application No. 09/451,630, filed on Nov. 30, 1999.

(51) Int. Cl.[7] .................................................. G06F 1/16
(52) U.S. Cl. ...................... 361/683; 361/686; 343/702; 455/90
(58) Field of Search ................................. 361/679–683, 361/686, 727, 755, 741; 206/320, 576, 38, 214, 232, 472, 471; 220/581, 836, 843, 845, 848, 811, 813, 815, 4.22; 16/319, 284, 292, 317, 297, 223, 235; 402/4, 4.01, 70, 79, 502; 345/179, 180, 173; 455/90, 575; 343/702, 720

(56) References Cited

U.S. PATENT DOCUMENTS

| | | |
|---|---|---|
| 3,744,034 A | 7/1973 | Paul |
| 4,559,705 A | 12/1985 | Hodge et al. |
| 4,762,227 A | 8/1988 | Patterson |
| 4,847,798 A | 7/1989 | Kurashima |
| 4,860,372 A | 8/1989 | Kuzunuki et al. |
| 4,916,441 A | 4/1990 | Gombrich |
| 4,972,496 A | 11/1990 | Sklarew |
| 5,002,184 A | 3/1991 | Lloyd |
| 5,040,296 A | 8/1991 | Yerger |
| 5,049,862 A | 9/1991 | Dao et al. |
| 5,128,829 A | 7/1992 | Loew |
| 5,165,415 A | 11/1992 | Wallace et al. |
| 5,205,017 A | 4/1993 | Wang |
| 5,231,381 A | 7/1993 | Duwaer |
| 5,253,142 A | 10/1993 | Weng |
| 5,283,862 A | 2/1994 | Lund |
| 5,305,394 A | 4/1994 | Tanaka |
| D355,165 S | 2/1995 | Sakaguchi et al. |
| 5,389,745 A | 2/1995 | Sakamoto |
| 5,401,917 A | 3/1995 | Yoshida et al. |
| 5,430,248 A | 7/1995 | Levy |
| 5,434,929 A | 7/1995 | Beernick et al. |

(List continued on next page.)

OTHER PUBLICATIONS

Gray, R. et al., "Efficient MC68HC08 programming: reducing cycle count and improving code density", *Dr. Dobb's Journal*, vol. 20, No. 5, May 1995, pp. 70–75.

Ruley, J. et al., "Handheld–to–Handheld Combat", *Windows Magazine*, No. 811, p. 55, Nov. 1997.

(List continued on next page.)

*Primary Examiner*—Darren Schuberg
*Assistant Examiner*—Michael Datskovsky
(74) *Attorney, Agent, or Firm*—Van Mahamedi; Hickman Palermo Truong & Becker LLP

(57) ABSTRACT

An attachment mechanism is provided to couple an accessory device with a handheld computer. The attachment mechanism includes a spine adapted to detachably couple to an accessory slot of the handheld computer. The spine includes a deformable layer that deforms as the spine inserts into the accessory slot. The deformable layer expands within the accessory slot to couple the accessory device to the handheld computer.

43 Claims, 9 Drawing Sheets

U.S. PATENT DOCUMENTS

| | | |
|---|---|---|
| 5,444,192 A | 8/1995 | Shetye et al. |
| 5,448,433 A | 9/1995 | Morehouse et al. |
| 5,452,371 A | 9/1995 | Bozinovic et al. |
| D366,463 S | 1/1996 | Ive et al. |
| 5,489,924 A | 2/1996 | Shima et al. |
| D368,079 S | 3/1996 | Ive et al. |
| 5,528,743 A | 6/1996 | Tou et al. |
| 5,530,208 A * | 6/1996 | Moriconi et al. ............. 178/18 |
| 5,530,234 A | 6/1996 | Loh et al. |
| 5,534,892 A | 7/1996 | Tagawa |
| 5,548,477 A | 8/1996 | Kumar et al. |
| 5,550,715 A | 8/1996 | Hawkins |
| 5,555,157 A | 9/1996 | Moller et al. |
| 5,564,850 A | 10/1996 | Nagaoka |
| 5,576,502 A | 11/1996 | Fukushima et al. |
| 5,597,256 A * | 1/1997 | Burton et al. .................. 402/4 |
| 5,615,284 A | 3/1997 | Ryne et al. |
| 5,621,817 A | 4/1997 | Bozinovic et al. |
| 5,622,789 A | 4/1997 | Young |
| 5,630,148 A | 5/1997 | Norris |
| 5,635,682 A | 6/1997 | Cherak et al. |
| 5,638,257 A | 6/1997 | Kumar et al. |
| 5,646,649 A | 7/1997 | Iwata |
| 5,657,459 A | 8/1997 | Yanagisawa |
| 5,661,641 A | 8/1997 | Shindo |
| 5,675,524 A | 10/1997 | Bernard |
| 5,682,182 A | 10/1997 | Tsubosaka |
| 5,684,672 A | 11/1997 | Karidis et al. |
| 5,698,822 A | 12/1997 | Haneda et al. |
| 5,737,183 A | 4/1998 | Kobayashi et al. |
| 5,739,791 A | 4/1998 | Barefield et al. |
| D394,449 S | 5/1998 | Shimizu |
| 5,757,681 A | 5/1998 | Suzuki et al. |
| 5,786,061 A | 7/1998 | Banfield |
| 5,810,461 A | 9/1998 | Ive et al. |
| 5,821,510 A | 10/1998 | Cohen et al. |
| 5,831,613 A | 11/1998 | Johnston et al. |
| 5,841,901 A | 11/1998 | Arai et al. |
| 5,848,298 A | 12/1998 | Steere, Jr. et al. |
| 5,889,512 A | 3/1999 | Moller et al. |
| D408,021 S | 4/1999 | Haitani et al. |
| D411,179 S | 6/1999 | Toyosato |
| D411,181 S | 6/1999 | Tamaki et al. |
| 5,913,629 A | 6/1999 | Hazzard |
| 5,914,708 A | 6/1999 | LaGrange et al. |
| 5,941,648 A | 8/1999 | Robinson et al. |
| 5,942,177 A | 8/1999 | Banfield |
| 5,953,205 A | 9/1999 | Kambayashi et al. |
| D416,001 S | 11/1999 | Tal et al. |
| D417,657 S | 12/1999 | Matsumoto |
| 5,996,956 A | 12/1999 | Shawver |
| 5,999,827 A | 12/1999 | Sudo et al. |
| 6,003,052 A | 12/1999 | Yamagata |
| D420,987 S | 2/2000 | Miyahara et al. |
| 6,023,251 A | 2/2000 | Koo et al. |
| 6,032,866 A | 3/2000 | Knighton et al. |
| 6,034,685 A | 3/2000 | Kuriyama et al. |
| D422,271 S | 4/2000 | Kawashima |
| D423,468 S | 4/2000 | Jenkins |
| 6,050,735 A | 4/2000 | Hazzard |
| 6,052,279 A | 4/2000 | Friend et al. |
| D424,533 S | 5/2000 | Kandalepas |
| 6,064,864 A | 5/2000 | Lakhani et al. |
| 6,066,811 A * | 5/2000 | Heilman .................. 178/18.01 |
| D426,236 S | 6/2000 | Kim et al. |
| 6,105,350 A | 8/2000 | Ng et al. |
| 6,108,200 A | 8/2000 | Fullerton |
| 6,115,248 A | 9/2000 | Canova et al. |
| D431,598 S | 10/2000 | Kim et al. |
| 6,129,430 A | 10/2000 | Wu |
| 6,151,206 A | 11/2000 | Kato et al. |
| 6,161,882 A | 11/2000 | Murphy et al. |
| D436,963 S | 1/2001 | Kim et al. |
| 6,178,078 B1 | 1/2001 | Yamanishi |
| 6,181,284 B1 | 1/2001 | Madsen et al. |
| 6,188,363 B1 | 2/2001 | Suzuki et al. |
| 6,191,743 B1 | 2/2001 | Jones et al. |
| 6,195,589 B1 | 2/2001 | Ketcham |
| 6,200,056 B1 * | 3/2001 | Jordin et al. .................... 402/4 |
| D440,542 S | 4/2001 | Hawkins et al. |
| 6,229,695 B1 | 5/2001 | Moon |
| 6,239,968 B1 * | 5/2001 | Kim et al. .................. 361/679 |
| D443,300 S | 6/2001 | Kim et al. |
| 6,262,684 B1 | 7/2001 | Stewart et al. |
| 6,266,240 B1 * | 7/2001 | Urban et al. ................. 361/686 |
| 6,344,848 B1 * | 2/2002 | Rowe et al. ................. 345/179 |
| 6,356,442 B1 * | 3/2002 | Lunsford ..................... 361/686 |
| 6,356,443 B2 * | 3/2002 | Jenks et al. .................. 361/686 |
| 6,388,870 B1 | 5/2002 | Canova, Jr. et al. |
| 6,388,877 B1 | 5/2002 | Canova, Jr. et al. |

OTHER PUBLICATIONS

Dayton, D., "FRx extends reporting power of Platinum Series", *PC Week*, vol. 8, No. 5, p. 29(2), Feb. 1991.

Forbes, J. et al., "Palm PCs get a Big Hand (What's Hot)", *Windows Magazine*, No. 905, p. 96, May 1998.

Penwarden, M., "More Muscle for HP's OmniBook", *Windows Magazine*, No. 501, p. 110, Jan. 1994.

Feigel, C., "IBM, Motorola preview embedded PowerPCs; 403 and 405 processors combine strong performance with low cost", *Microprocessor Report*, vol. 8, No. 6, pp. 1–5, May 1994.

* cited by examiner

FIGURE 10
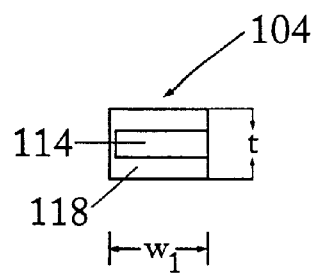
FIGURE 7
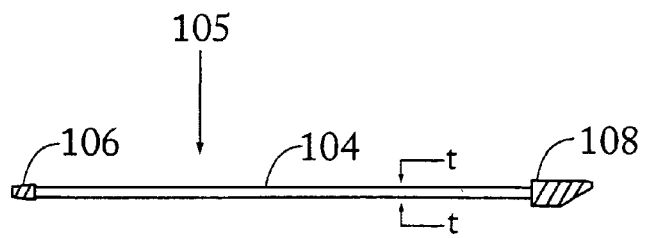
FIGURE 8
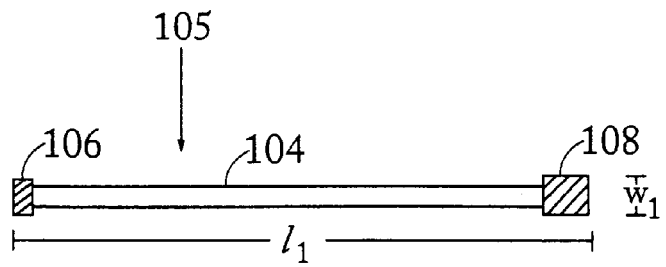
FIGURE 5

MECHANISM FOR ATTACHING ACCESSORY DEVICES TO HANDHELD COMPUTERS

RELATED APPLICATIONS

The application is a continuation-in-part of application Ser. No. 09/502,169, filed Feb. 11, 2000, now U.S. Pat. No. 6,266,240 entitled "Encasement For a Handheld Computer"; application Ser. No. 09/451,630, filed Nov. 30, 1999, entitled "Cover For A Handheld Computer"; both of the above-cited applications being hereby incorporated by reference.

BACKGROUND OF THE INVENTION

1. Field of the Invention

This invention relates to the field of accessory devices for handheld computers. In particular, the invention relates to attachment mechanism for such accessory devices.

2. Description of the Related Art

Handheld computers may include slots for receiving stylus and/or accessory devices. The slots may be used for carrying styluses that can be used to operate the handheld computers. In some handheld computers, the slots may double for purpose of receiving accessory devices.

The slots sometimes enable the spine or stylus being retained therein to jiggle or move about. The accessory devices and stylus may become detached from the handheld computer as a result of the spacing within the accessory device.

Furthermore, some handheld computers require accessory devices, stylus and other peripherals to be inserted into slots for retention. When these devices are inserted into handheld computers, the movement of the devices along the longitudinal axis of the slots may cause the devices to inadvertently jog free of the handheld computer. For example, styluses and other devices may fall from the handheld computer if the handheld computer is held upside down or dropped.

SUMMARY OF THE INVENTION

Embodiments of the invention provide an attachment mechanism for coupling an external device to a handheld computer. In one embodiment, an external device is equipped with a spine having a deformable layer. The spine is inserted into a device slot of the handheld computer. The deformable layer deforms to enable the handheld computer and accessory device to detachable couple to one another.

In one embodiment, an external device includes a spine having a frictional surface. The spine may be inserted into a slot of the handheld computer so as to bind the frictional surface of the spine to a corresponding surface of the handheld computer.

In another embodiment, a spine of an external device includes a T-shaped cross-section to increase the retention force of the spine within the slot of the handheld computer.

In another embodiment, a handheld computer is provided with a slot for receiving a spine of an external device. The slot may be configured to receive a spine having a rectangular cross-section.

In another embodiment, the slot is configured to receive a flexible spine that can be bent for entrance into the slot. The slot includes an interior structure to receive the spine while supporting the spine from yielding.

In still another embodiment, the slot may be laterally positioned on a surface of the handheld computer and configured to cause a bendable spine to bias as it is inserted into the slot. The bias of the spine is directed towards moving the spine laterally against the handheld computer concurrently with the spine being moved into the slot.

BRIEF DESCRIPTION OF THE FIGURES

FIG. 5 is a side view of a handheld computer for use with an accessory device, under an embodiment of the invention.

FIG. 7 is a side view of a spine for an accessory device, under an embodiment of the invention.

FIG. 8 is a frontal view of the spine, under an embodiment of the invention.

FIG. 10 is a cross-section of a spine, under an embodiment of the invention.

DETAILED DESCRIPTION

A. Overview

Figure 1:
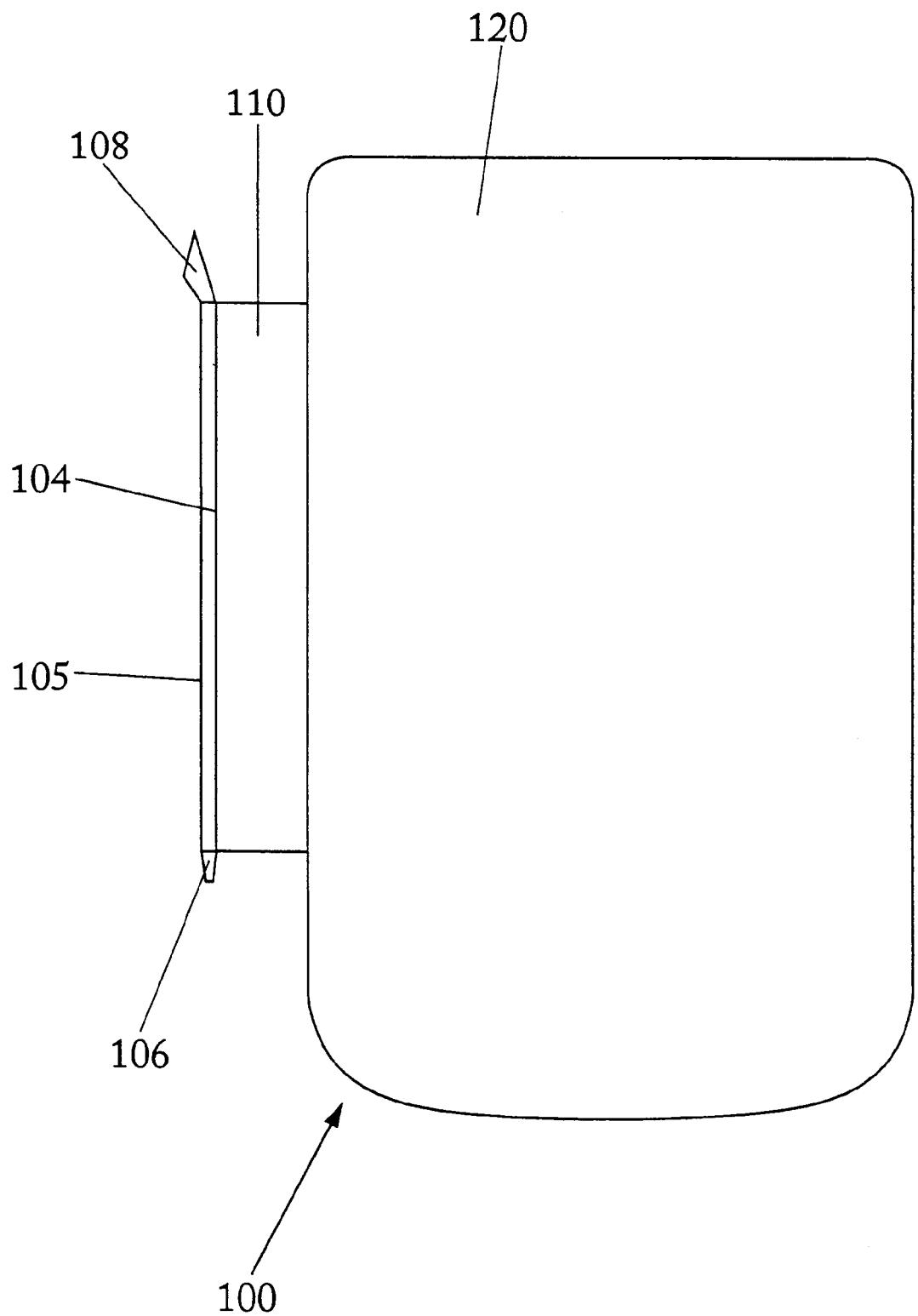
FIG. 1 is a frontal view of an accessory device including an attachment mechanism, under an embodiment of the invention.

Embodiments of the invention include an attachment mechanism for coupling an external device to a handheld computer. The external device may include an elongated member or spine that can deform to insert and be retained within a slot of a handheld computer. The deformable layer ensures a snug and secure fit. The spine is removable from the slot of the handheld computer. The spine and deformable layer may be integrated or coupled with an accessory device, peripheral device, or stylus that is coupleable with the handheld computer.

An embodiment of the invention includes an attachment mechanism for coupling an external device to a handheld computer. The attachment mechanism includes an elongated member having a deformable layer. The elongated member engages a slot on the handheld computer to detachably couple the external device to the handheld computer. The deformable layer deforms to enable the elongated member to insert and be retained within the slot of the handheld computer.

The term deformable as used herein refers to a characteristic of a member that allows a cross-section of the member to be measurably reduced with a compressive force. Under an embodiment of the invention, a deformable layer compresses to reduce its cross-section by at least 1%.

As used herein, an external device includes a stylus, a peripheral device or an accessory device. An accessory device is an item that adds functionality to the handheld computer. The slot on the handheld computer may include device slots, rails, or openings. The slot may double for receiving an accessory device or a stylus.

One advantage provided under an embodiment of the invention is that an external device coupled to the handheld computer is precluded or resisted from moving longitudinally with the slot of the handheld computer. This feature may be provided by frictional layers on the portion of the external device being inserted into the handheld computer. The feature may also be provided by the structure of the slot on the handheld computer, in a manner described below. The limited longitudinal movement of the external device provides a more secure, detachable coupling.

In another embodiment, a handheld computer includes a housing having a front face and a back face, a top surface and a bottom surface defining a first axis, and a first side and a second lateral side defining a second axis. A display is provided on the front face. The housing retains an antenna element, positioned relative to the first axis to be between the display and the top surface. A slot is configured to receive an elongated member. The slot includes an entrance that extends towards the bottom surface. The slot is positioned between the bottom surface and the antenna element along the first axis.

In such embodiments, the handheld computer may be employed to carry out wireless communications, while including a slot for coupling with other devices. The slot configuration reduces the overall size of the handheld computer, when compared to handheld computers using stylus-shaped device slots.

Another embodiment of the invention includes a handheld computer including a housing. A slot is formed into the housing to receive an elongated external device. The slot is positioned so that the elongated device has to bend to be inserted into the housing. The slot may include an internal structure that supports the elongated device from yielding when it is being inserted.

The resulting handheld computer is equipped to retain a spine or elongated member of an external device in a more secure fashion than other known handheld computers. In particular, such handheld computers resist movement of the external devices with the slots. As a result, the external device and handheld computer can be detachable coupled in a more secure fashion.

B. External Device With Attachment Mechanism

FIG. 1 illustrates an accessory or other external device configured to include an attachment mechanism, under an embodiment of the invention. For examples provided, the attachment mechanism is assumed to be a portion of an external device. In embodiments described, the external device is assumed to be an accessory, specifically a detachable cover for a handheld computer. Other embodiments may vary the construction and function of the external device. For example, the attachment mechanism may be used with a housing for electrical components and circuitry. The housing of the attached device may be shaped as a cover, or otherwise be extendible over a surface of the handheld computer. Still further, the attachment mechanism may be applicable to external devices such as styluses.

In an embodiment, accessory device 100 includes a spine 105, a flex portion 110, and a cover portion 120. The accessory device 100 is shown oriented so that the cover portion 120 extends completely over a display of the handheld computer when the two devices are coupled.

Figure 2:
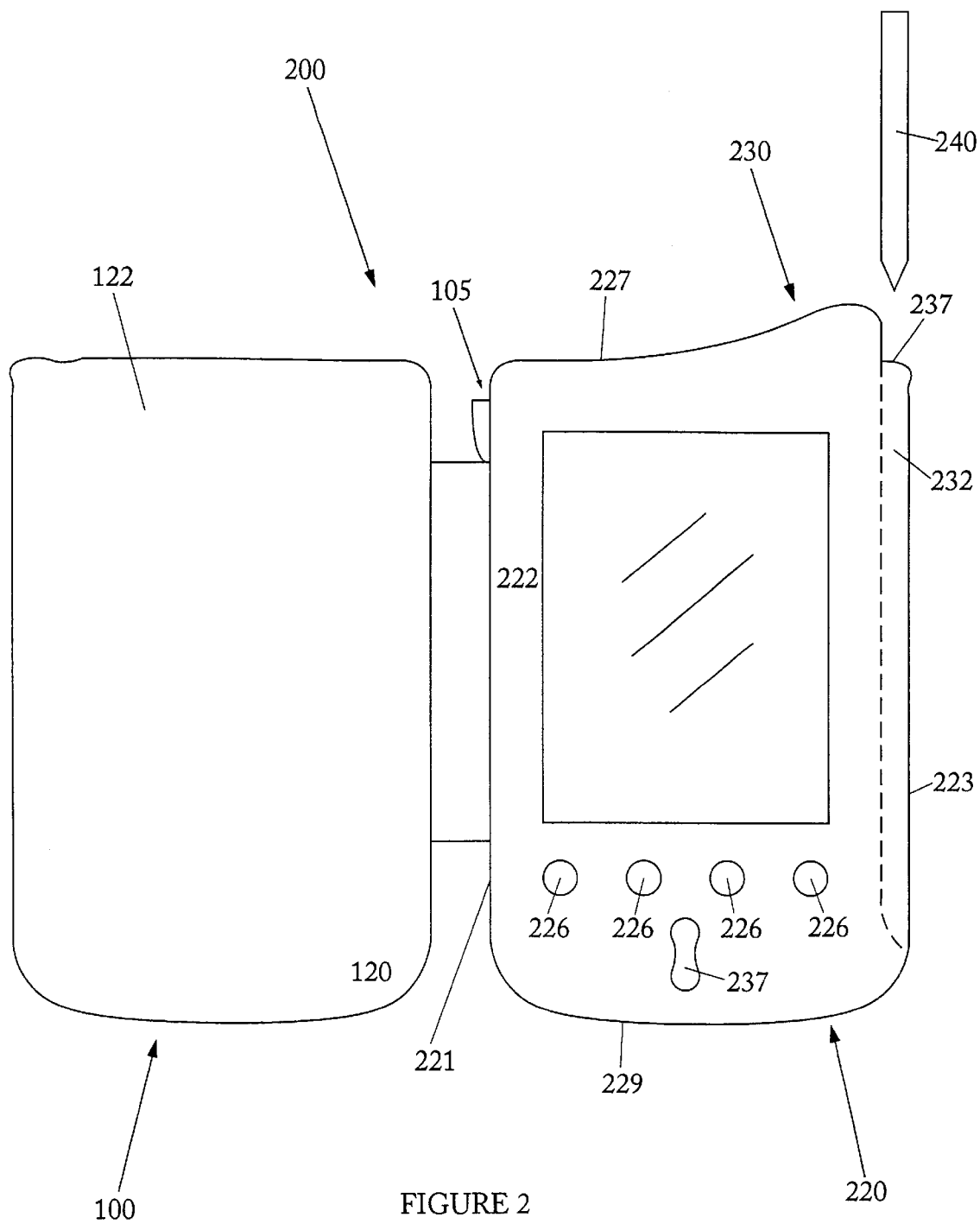
FIG. 2 is a frontal view of a detachable assembly, including a handheld computer and an accessory device, under an embodiment of the invention.

The spine 105 is shaped to engage a device slot 212 (FIG. 5) of a handheld computer 220 (FIG. 2). The spine 105 includes a bottom end piece 106 and a top end piece 108. The top end piece 108 is enlarged relative to the bottom end piece 106. A member 104 extends between the bottom end piece 106 and the top end piece 108. As will be further described, at least the member 104 of spine 105 is deformable to facilitate accessory device 100 in detachable coupling to handheld computer 220.

In an embodiment, cover portion 120 and flex portion 110 are each formed from a tensile material. For example, the flex portion 110 and cover portion 120 may each be formed from leather, plastic, vinyl, rubber, fabric or other suitable material. The flex portion 110 may be a unitary, integrated or attached extension of cover portion 120. Flex portion 110 can be stitched or glued to cover portion 120. Likewise, cover portion 120 may be formed as unitary, integrated, or attached feature of spine 105, or of flex portion 110.

In an embodiment, member 104 includes a deformable material clad around a rigid core. The rigid core may be pliable or able to flex about its length. The deformable material is preferable leather, rubber, or plastic. Other examples of deformable materials for the member 104 include vinyl or fabric. Examples of materials used for the core include metals such as aluminum, tin, or copper, although any flexing rigid material may be suitable, such as for example, wood. The bottom end piece 106 and top end piece 108 may be formed from moldable materials, such as plastic.

FIG. 2 illustrates a detachable assembly 200, under an embodiment of the invention. The detachable assembly includes a handheld computer 220 that is detachably coupled to accessory device 100 through spine 105. The handheld computer 220 includes a front face 222, and a back face 242 (FIG. 4) opposing the front face. The front face 222 spans between a top 227 and a bottom 229 of the handheld computer 200. The front face 222 provides access to a display 224, as well as a plurality of application buttons 226 and a rocking switch 237. The handheld computer 220 also includes a first lateral side 221 and a second lateral side 223. The first and second lateral sides 221 and 223 extend between the front face 222 and the back face, as well as between the top 227 and bottom 229. An antenna 230 is provided on or adjacent to the top 227 of the handheld computer 200.

Examples of handheld computers for use with embodiments of the invention include devices operating a Palm®, Windows CE®, or Windows PocketPC® device. Other examples include devices equipped for use as cellular phones, wireless devices including Wireless Access Protocol (WAP) enabled devices and wireless devices using web-browsers. Specific examples of such devices include PalmPilot®, Palm III®, Palm V®, and Palm VII® electronic organizers, manufactured by Palm Inc.

In the embodiment shown, accessory device 100 engages first device slot 212 (See FIG. 5) positioned on or adjacent to the first lateral side 221 of handheld computer 220. The handheld computer 220 includes a second device slot 232 (shown in phantom) positioned on or adjacent to the second lateral side 223. The second device slot 232 includes an entrance opening 237 for receiving an external device from top 227. Preferably, second device slot 232 is dimensioned differently than first device slot 212. In the example shown, second device slot 232 is used to receive a stylus 240 or stylus type device, which may be wider and/or longer than spine 105. The stylus 240 may also have a circular or elliptical cross-section, while spine 105 may be provided a rectangular cross-section. The second device slot 232 may even be used for accessory devices that have stylus-type spines, having dimensions different than spine 105.

When coupled, the cover portion 120 of accessory device 100 includes an inside surface 122 that can be positioned to overlay and be immediately adjacent to the front face 222. The inside surface 122 is moveable about the connection formed by spine 105 and first device slot 212 so to be positionable on front face 222. Preferably, the cover portion 120 has dimensions that are sufficient to at least cover display 224, and more preferably, application buttons 226 and rocking switch 237. The inside surface 122 may include pockets and other interior features to maximize the utility of the accessory device 100, as described U.S. patent application Ser. No. 09/451,630 (hereby incorporated by reference). In addition, cover portion 120 may house circuitry and electrical components to form accessorial electrical and/or computational functions, as described U.S. patent application Ser. No. 09/573,451 (hereby incorporated by reference).

Figure 3:
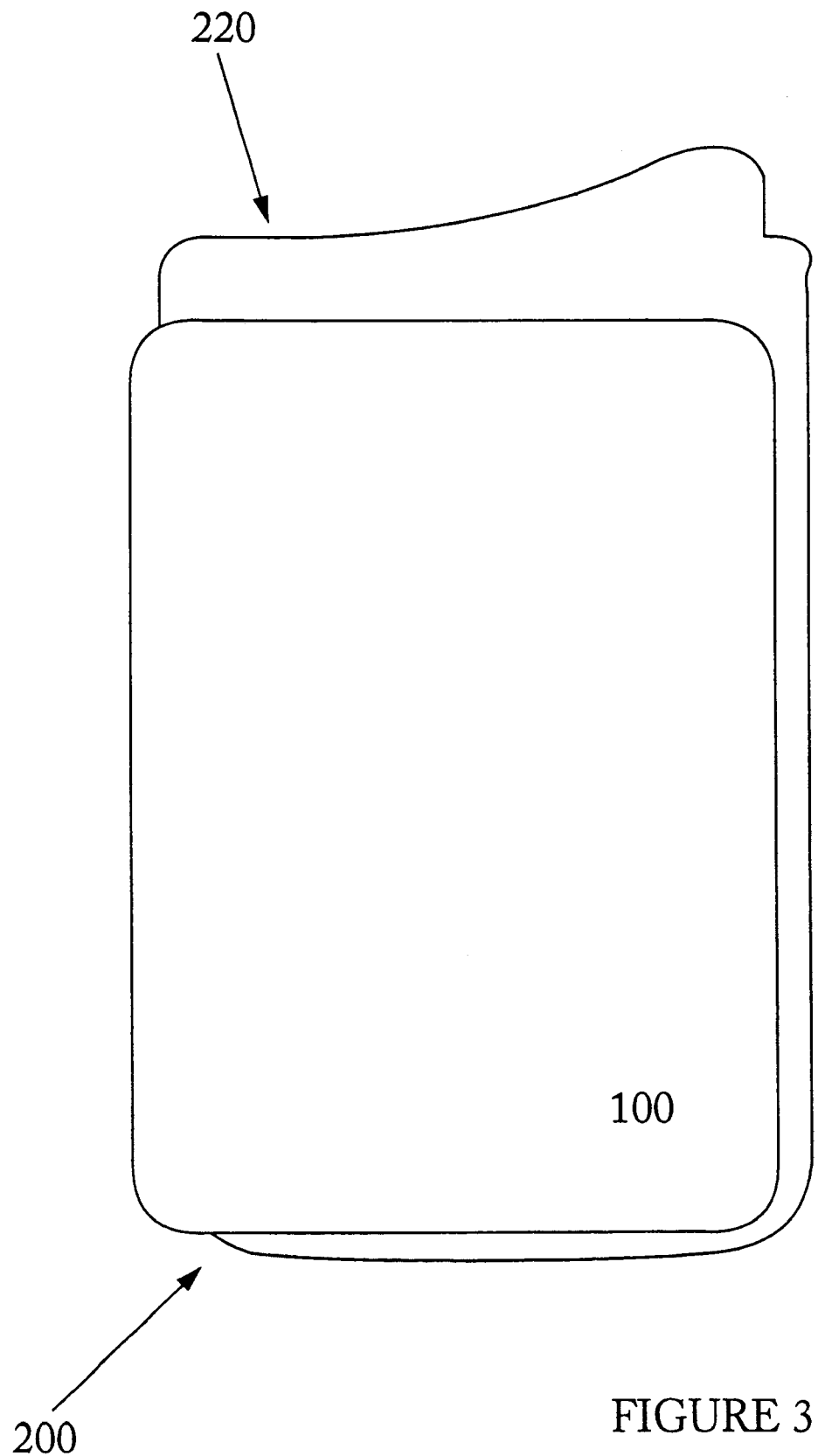
FIG. 3 is a frontal view of a handheld computer with a cover of the accessory device extending over a front face, under an embodiment of the invention.

FIG. 3 illustrates detachable assembly 200, with cover portion 120 of accessory device 100 positioned to be adjacent to front face 222 so as to extend over display 224. The cover portion 120 can be rotated about the spine 105, and preferably includes sufficient movement to flip from the front face 222 to the back face of the handheld computer. In one embodiment, the freedom of motion is provided by the flexibility and length of the flex portion 110. In other embodiment, spine 105 may be configured to be rotatable about first device slot 212 (FIG. 5).

Figure 4:
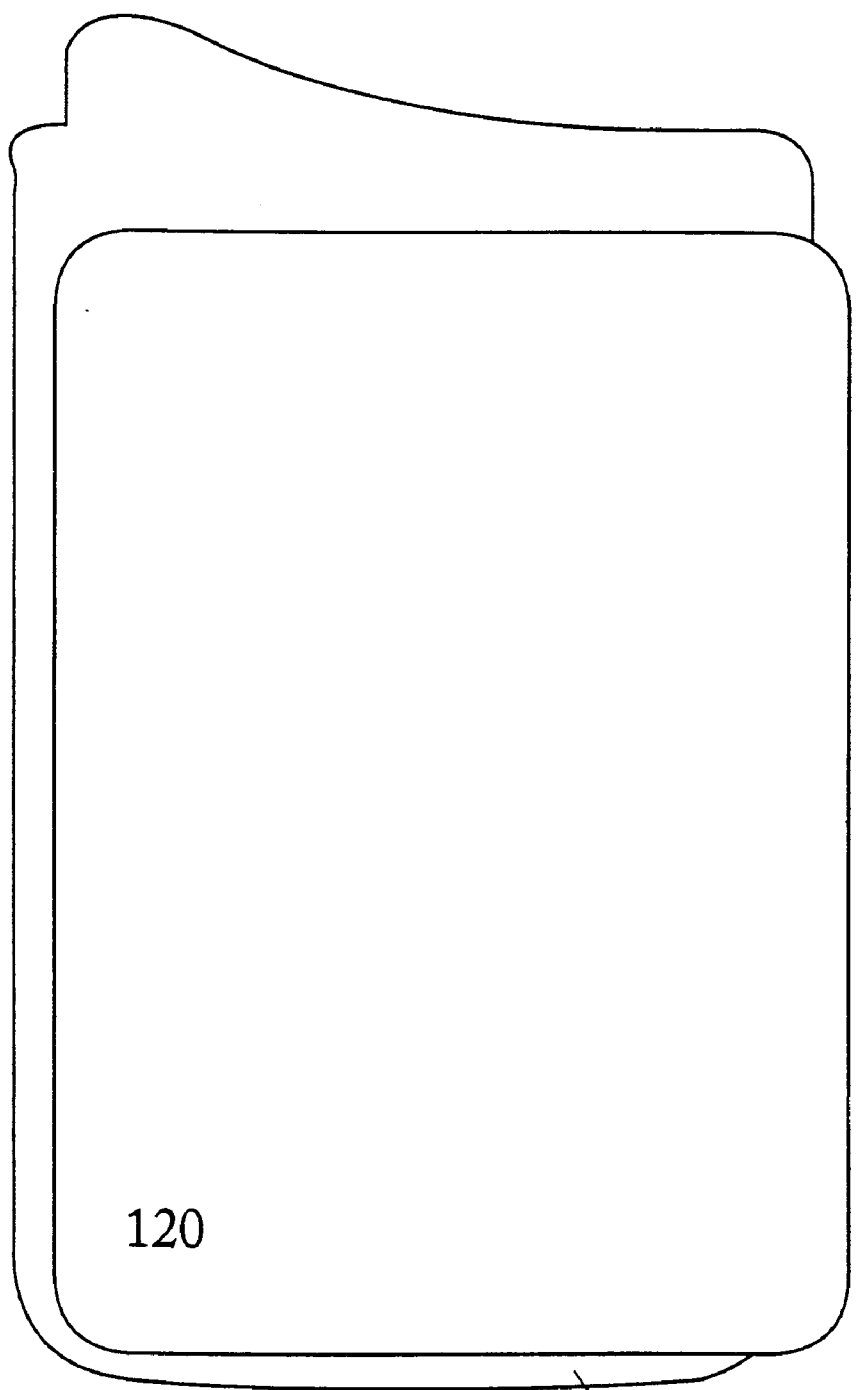
FIG. 4 is a rear view of the handheld computer with the cover of the accessory device extending over a rear face, under an embodiment of the invention.

FIG. 4 illustrates the accessory device 100 with the cover portion 120 flipped to be adjacent to a back face 242 of handheld computer 220. FIG. 4 illustrates that flex portion 110 (FIG. 1) may be used as a hinge, enabling cover portion 120 to moved from being positioned adjacent front face 222 (See FIG. 2) to being adjacent to back face 242. A user of handheld computer 220 may flip the cover to be adjacent to back face 242 in order to use the device, such as by viewing display 224 (FIG. 3) or actuating applications buttons 226 (FIG. 3).

In this way, the user may avoid detaching the accessory device 100 from handheld computer 220 to access display 224, application buttons 220 or rocking switch 227.

C. Handheld Computer With Device Slot

FIG. 5 is a side view of handheld computer 220, illustrating first device slot 212 positioned on a housing 260 of handheld computer to receive spine 105 of accessory device 100. Preferably, first device slot 212 is positioned on first lateral side 221, between the front face 222 and back face 242 of handheld computer 220. In an embodiment, first device slot 212 is shaped to slideably receive spine 105 as it is inserted end-first in a lengthwise direction. The device slot 212 is accessible to spine 105 through an entrance 234. The entrance 234 is merged with an elongated section 233 (shown in phantom). The elongated section 233 extends along a subsection of the housing 260, and is shaped to receive member 104 and bottom end piece 106. The device slot 212 includes an exposed length 262 extending with the elongated section 233. The exposed length 262 provides a structure within device slot 212 access to extend beyond housing 260. For accessory device 100, cover portion 120 may extend from spine 105 to cover a face of handheld computer 220 when spine 105 is inserted in first device slot 212.

In an embodiment, at least one cross-sectional dimension of the elongated section 233 is sufficiently small to frictionally receive the member 104, while another dimension of elongated section 233 may be sufficient to allow bottom end piece 106 to pass through. The device slot 212 extends a depth into the casing of handheld computer 220. The entrance 234 is preferably a recess formed into the lateral side 221 of the handheld computer 220.

The entrance 234 of device slot 212 is positioned a distance x from the top 227. The position of device slot 212 enables spine 105 to be attached to handheld computer 220 without interfering with radio frequency communications of handheld computer's antenna, in a manner described with FIG. 6.

Figure 6:
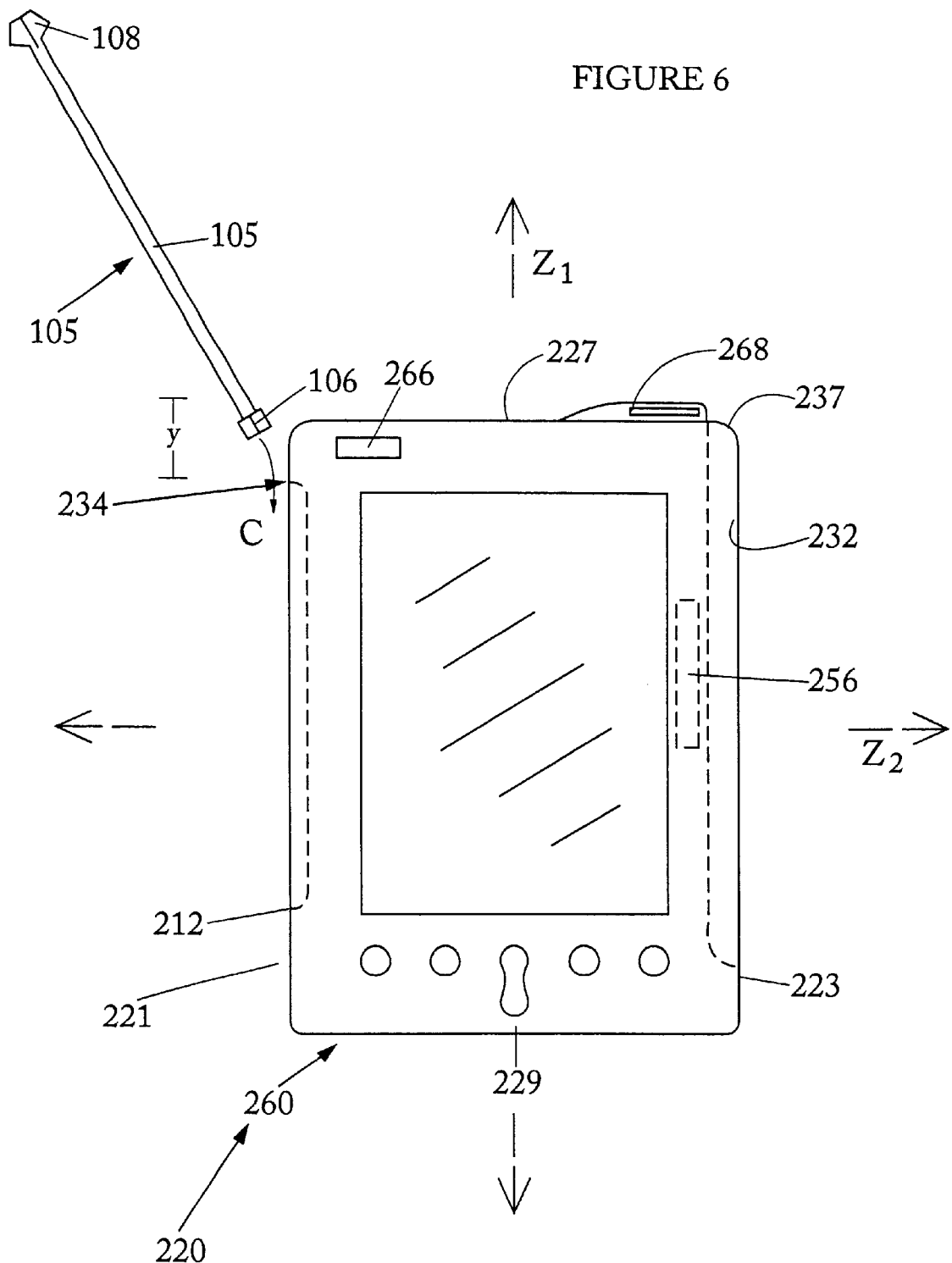
FIG. 6 is a frontal view of a handheld computer incorporating a device slot, under an embodiment of the invention.

FIG. 6 is a frontal view of handheld computer 220, including first device slot 212, under an embodiment of the invention. The front face 222 of handheld computer 220 includes display 224. A driver 256 (shown in phantom) is positioned within the housing adjacent to the display 224. Preferably, device slot 212 is positioned on or proximate to first lateral side 221. The second lateral side 223 includes a second device slot 232, having an opening 237 for receiving a stylus 240 (FIG. 2). Preferably, opening 237 is formed on top 27.

For descriptive purposes, reference is made between a first axis z1 extending the length of handheld computer 220, defined to be between top 227 and bottom 229. A second axis z2 extends the width of handheld computer 220, defined to be between the first lateral side 221 and the second lateral side 223.

The first device slot 212 extends a portion of the length along axis z1. A first antenna element 266 is retained within housing 260 of the handheld computer 220. A second antenna element 268 may be positioned on the top 227. The first antenna element 266 may be a ceramic chip antenna for transmitting radio-frequency signals. The antenna chip 266 is positioned along z1 to be between top 227 and the entrance 234 to first device slot 212. Preferably, the antenna element 266 is immediately adjacent to top 227.

In an embodiment, spine 105 (shown in FIG. 6 to be without a body) is engageable with device slot 212 at an acute angle relative to z1. Path C is intended to illustrate the path of a point on the spine 105 as the spine 105 is engaged and retained by device slot 212. Preferably, the angle is less than thirty degrees. When spine 105 is engaged with device slot 212, the portion of spine 105 that is still not inserted is acutely angled with the device slot 212, creating a bend in spine 105. The spine 105 has sufficient flexure properties to bend while being inserted. The flexure properties of spine 105 create a bias that tends to direct the portion of the spine outside of device slot 212 towards the housing 260.

When fully inserted, top end piece 108 of spine 105 is positioned at entrance 234 of device slot 212, the distance x from top 227 of handheld computer 220. The proximity of antenna chip 266 and spine 105 may be measured relative to a distance along axis z1. This position of spine 105 avoids disruption to antenna element 266, especially if spine 105 includes metallic or conductive materials. In one embodiment, the proximity between second end piece 108 and the top 227 is between 8–12 mm, and the proximity between spine 105 and antenna chip 266 is between 6–8 mm.

With some known devices, the driver 256 has space requirements that preclude positioning the display 224 centrally about first axis z1. In contrast, under an embodiment, device slot 212 occupies a smaller foot-print on the surface of handheld computer 220. This allows device slot 212 to be positioned, between first lateral side 221 and display 224 relative to second axis z2. The driver 256 may then be positioned between the display 224 and the second lateral side 223, relative to second axis z2. This configuration enables handheld computer 220 to be symmetrical on front face 222. In particular, display 224 is centrally positioned relative to second axis z2. In other words, the lateral distance b measured between each side of display 224 and the proximate lateral side 221, 223 is about the same (preferably within 0.1 mm).

D. Attachment Mechanism

FIG. 7 is a side view of spine 105, corresponding to the perspective of FIG. 5 for device slot 212. The member 104 includes bottom end piece 106 and top end piece 108. The top end piece 108 is enlarged compared to bottom end piece 106. The top end piece 108 is shaped to be received and retained by entrance 234 of handheld computer 220. The dimension of top end piece 108 shown with FIG. 7 is too large to be able to pass through entrance 234. Thus, top end piece 108 rests in the entrance opening 134 and provides a catching point for users to remove spine 105 from the first device slot 212.

The dimension of bottom end piece 106 shown by FIG. 7 is thinner than top end piece 108, and sufficient to pass through first device slot 212. The bottom end piece 106 can then be forced down towards the bottom 229 of handheld computer 220 with member 104 sliding into position within first device slot 212. The top end piece 108 precludes further motion of the spine 105 when it is received in entrance 234. The first device slot 212 and spine 105 may also be dimensioned so that spine end piece 106 is obstructed from further downward movement when spine 105 is fully inserted. The member 104 of spine 105 includes a dimension represented by thickness t. In an embodiment, spine 105 is clad with a deformable layer 118 to deform along the direction of t.

FIG. 8 is a top view of spine 105, under an embodiment of the invention. The top view corresponds to the orientation of spine 105, viewed from a direction of lateral side 221 when spine 105 is inserted into first device slot 212. The spine 105 includes a thickness, referred as width $w_l$, and a length $l_l$. The spine 105 deforms to insert into first device slot 212, and then expands to a relaxed position when inserted. Preferably, the deformation and relaxation is in an orthanormal direction width w and length l. However, some deformation may also occur along width w, and even along length l.

Figure 9:
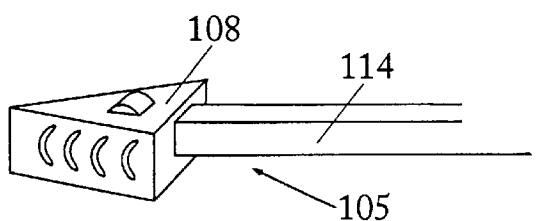
FIG. 9 is an isometric close-up of an end piece for the spine, under an embodiment of the invention.

FIG. 9 illustrates a construction of spine 105. A core 114 of member 104 is formed from a rigid material, such as a metal. Due to the dimensions of core 114, the rigid member is able to flex about its lengthwise axis. Preferably, top and bottom end pieces 106, 108 are molded onto the member 104. In FIG. 9, top end piece 108 is shown to be molded onto core 114. In a subsequent fabrication step, a deformable layer may be clad onto core 104. For example, leather or plastic cladding may be provided onto core 114 to enable spine member 104 to deform along the thickness shown by $w_l$.

In other embodiments, top and bottom end pieces 106, 108 may be pressed on, rolled back metal, glued on etc. Still further, top and bottom end pieces may be a unitary or integrated section of member 104.

FIG. 10 illustrates a cross-section of member 104 comprising core 114 clad with deformable layer 118. The member 104 is referenced according to dimensions of width $w_l$, and a thickness t. In an embodiment, member 104 includes the core 114, formed from a rigid material. Examples of rigid materials include metals such as tin, aluminum, steel, and copper. More exotic elements may also be used in other embodiments, such as for example, ceramics, carbon and titanium. The deformable layer 118 is preferably formed from resilient materials such as leather. Other suitable materials include plastic, vinyl, rubber, fabric and composites. As shown in FIG. 10, the deformable layer 118 preferably has the greatest amount of deformity along the thickness t of the member 104. This corresponds to how the structure of the device slot 212 engages member 104 upon insertion. The thickness t of member 104 extends a depth into the casing of the handheld computer 220. The width $w_l$ extends laterally within first device slot 212, which in the embodiments shown, corresponds to extending between front face 222 and backface 242 of the handheld computer 220 (See e.g. FIG. 13).

In other embodiments, spine 105 may be unitarily constructed. In such embodiment, an exterior portion of member 104 may form deformable layer 118. The material of spine 105 may include flexure properties, and be sufficiently rigid along its thickness to allow spine 105 to be insertable in and/or removable from device slot 212.

E. External Device Coupled To Handheld Computer

Figure 11:
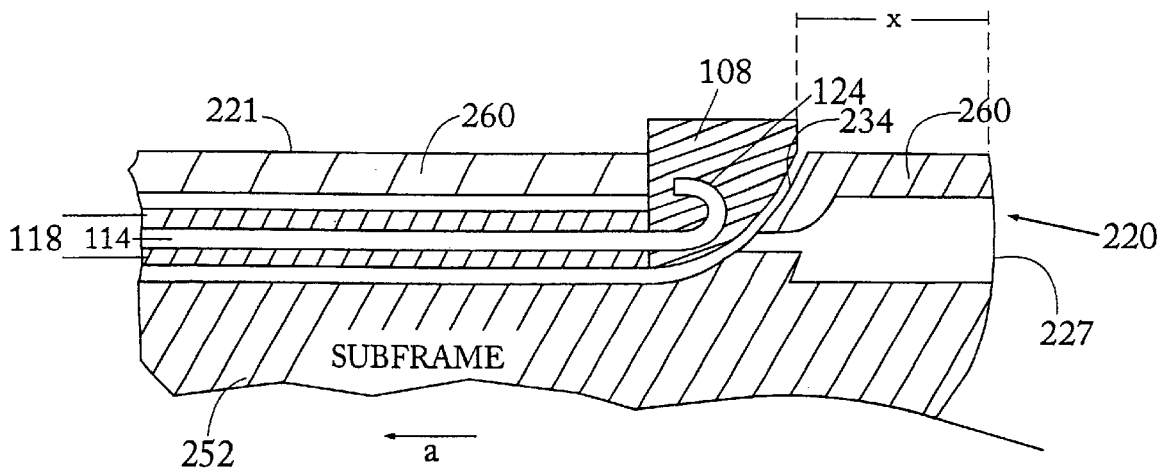
FIG. 11 is a side-sectional view of the handheld computer retaining a spine of an accessory device, under an embodiment of the invention.

FIG. 11 is a sectional side-view of handheld computer 220, similar to the perspective of FIG. 10, showing spine 105 inserted into device slot 212. The first device slot 212 is formed by casing 260 and a subframe 252. The entrance 234 is formed in part by a contour in the subframe 252 and/or casing 260, so that entrance 234 is a recess formed into first lateral side 221. In this orientation, cover portion 120 (now shown in this figure) may extend from first device slot 212 through the exposed length 262 (See FIG. 5). As shown, spine 105 is entered into device slot 212 along directional arrow a, corresponding to an orientation where bottom end piece 106 (See FIG. 6) engages entrance 234 first. The enlarged top end piece 108 forms a stop at entrance 234. The core 114 of spine 105 is clad with the deformable layer 118. The deformable layer 118 deforms as the spine 105 is inserted into the device slot 212. In the example shown, the deformation is primarily in the direction of the thickness for the member 104, oriented vertically on the paper. Furthermore, the deformation occurs at the portion of the spine 105 that extends past entrance 234 into the elongated section 233 of the first device slot 212. The deformable layer 118 may remain deformed to biasely retain spine 105 in the device slot 212. In the embodiments, the device slot 212 may include a lip or wedge that deforms the deformable layer 118 as it is inserted, but resists removal of the spine 105 after insertion.

In an embodiment, entrance 234 of device slot 212 is a recessed area of lateral side 221. FIG. 11 further illustrates that top end piece 108 may be molded around a metallic element of spine 105, specifically of a shaped end of member 104.

Figure 12:
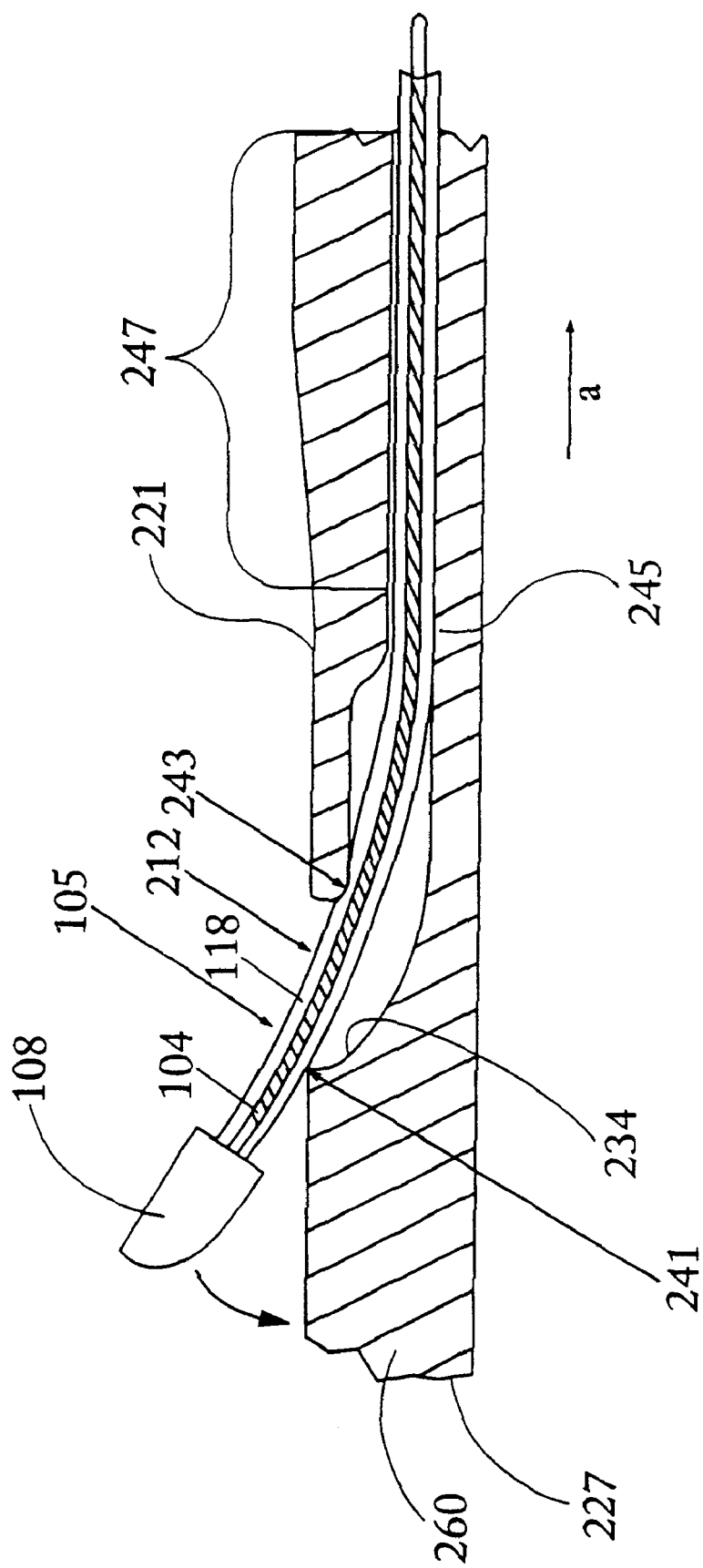
FIG. 12 is a side-sectional view of the handheld computer receiving the spine, under an embodiment of the invention.

FIG. 12 is a sectional side view of handheld computer 220, showing spine 105 partially inserted into first device slot 212. The orientation shown is intended to be represent the spine 105 inserted into device slot 212, from the perspective of viewing the cross-section from the front face 222 or the back face 224 of handheld computer 200. As shown, first device slot 212 is formed into a housing or casing 260 of handheld computer 220. The device slot 212 includes exposed length 262 (see FIG. 5) on casing 260. The spine 105 enters device slot 212 along directional arrow a, in an orientation where bottom end piece 106 (See FIG. 7) engages entrance 234 first. The top end piece 108 forms a stop at entrance 234. The spine includes core 114, clad with deformable layer 118. The core 114 is formed from rigid materials, and dimensioned so as to be flexible about its length.

The first device slot 212 is configured to receive and retain spine 105 from an angle so that spine 105 flexes when it is being inserted. The first device slot 212 includes an interior structure designed to support spine 105 when flexing. Preferably, the interior structure prevents spine 105 from yielding when flexing to enter first device slot 212. In an embodiment, first device slot 212 includes a plurality of discrete interior contact points that contact spine 105 as it is being inserted. The discrete contact points serve to support spine 105 from yielding during insertion. This is conceptually illustrated by the parabolic curve of spine 105. Reference is made to first axis z1.

In one embodiment, a first contact point 241 contacts the spine 105 so as to support the spine 105 towards an outwardly direction relative to the housing 260. Preferably, first contact point 241 is positioned in entrance 234, proximate to top 227. A second contact point 243 is positioned closer to the bottom 229 (FIG. 2), relative to z1. The second contact point 243 supports spine 105 towards an inward direction relative to housing 260. The second contact point 243 may be offset from the first contact point relative to lateral side 221. A third contact point 245 supports spine 105 further along first device slot 212. The third contact point 245 also supports spine 105 inwardly relative to housing 260. A contact region 247 confines an inserted portion of spine 105, limiting the spine's flexibility at that stage.

In an embodiment, the distance between the first contact point 241 and the second contact point 243 is between 14–22 mm, and preferably about 18–19 mm. The distance between the second contact point 243 and the third contact point is between 6–12 mm, and preferably about 9 mm. In addition, the first contact point 241 is on or near lateral surface 221. The third contact point 245 is between 1–4 mm a depth into the housing, and preferably a depth of 2 mm from the first contact point 241. The interior of first device slot 212 is defined by a thickness of the casing 260. Preferably, the thickness of casing 260 increases as from the second contact point 243 to the third contact point 245. This forms an L-shaped cross-section within first device slot 212. This cross-section provides sufficient range of motion for spine 105, with contact points 241, 243, and 245 positioned to support the spine 105 from yielding.

The deformable layer 118 deforms in regions that are supported by first contact point 241, second contact point 243, and third contact point 245. The contact region 247 may also deform the deformable layer 118. As a result, the interior structure of first device slot 212 supports spine 105 from yielding, while frictionally retaining spine 105 within first device slot 212.

Figure 13:
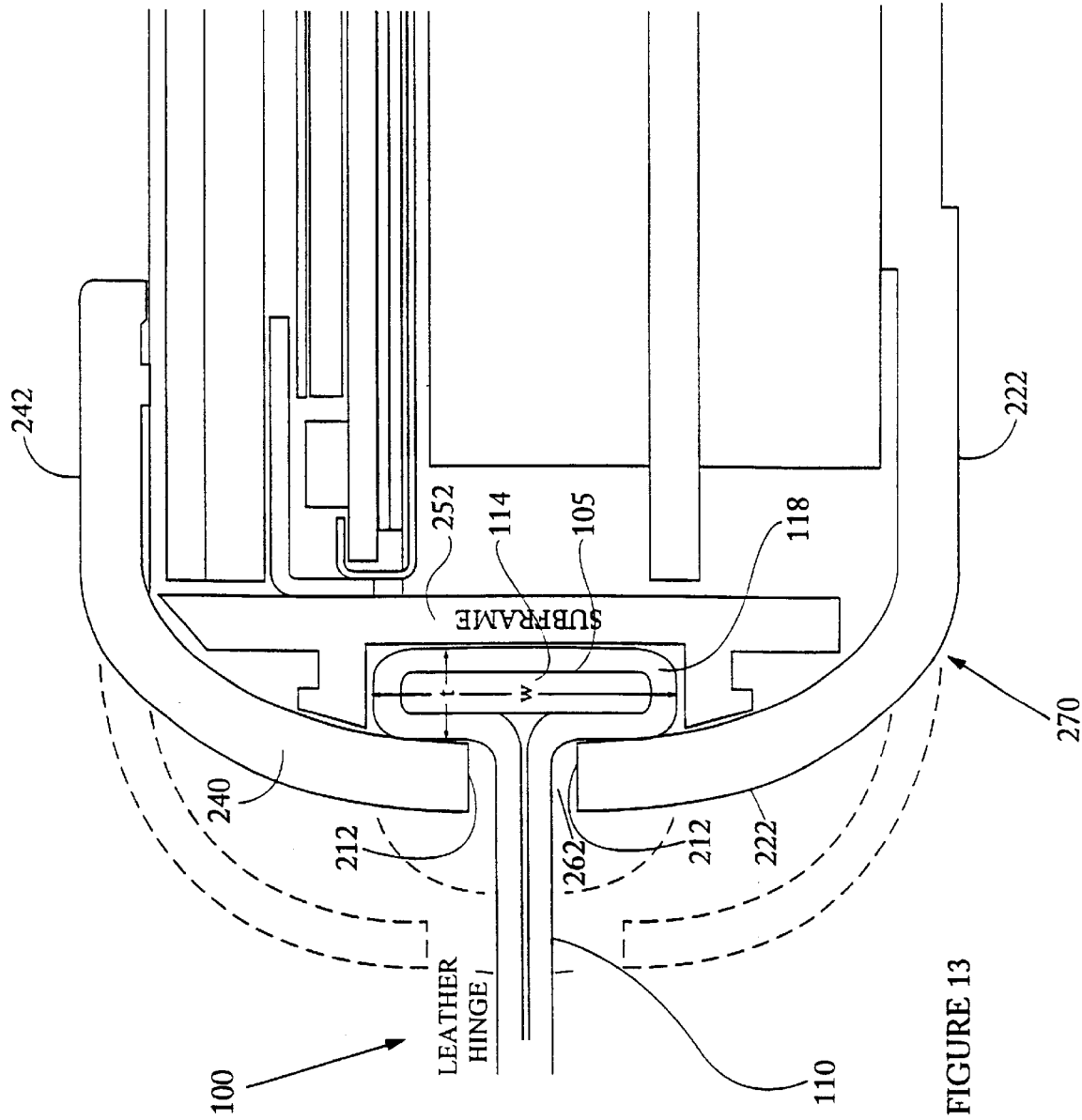
FIG. 13 is a top sectional view a handheld computer with a device slot retaining a spine having a rectangular cross-section, under an embodiment of the invention, compared with a circular device slot used in known devices.

FIG. 13 is a top view of handheld computer 220 with spine 105 inserted in device slot 212, under an embodiment of the invention. A configuration of a device slot 212 and another insertable member is shown in phantom to provide a relative comparison of an advantage of the embodiment described. In particular, the configuration of first device slot 212 and spine 105 allow for accessory device 100 to cover a smaller-footprint on housing 260, relative to devices using insertable members with circular cross-sections.

In an embodiment, device slot 212 is C-shaped, including exposed length 262 that extends vertically (into the paper) along the lateral side 221. As such, device slot 212 is configured to receive spine 105, having a rectangular cross-section. The first device slot 212 may include exposed length 262, which enables for a body to extend from spine 105, such as described with FIGS. 1 and 2. This enables device slot 212 is to receive a T-shaped cross-sectional member, formed by a combination of spine 105 and an extended body (i.e. cover portion 120). Among other advantages, the rectangular cross-section of spine 105 provides a greater resistive force against separating from the device through exposed length 262, when compared to insertable members of known devices having circular cross-sections.

In an embodiment, the exposed length 262 allows for flex portion 110 to acts as a hinge. The flex portion 110 enables cover portion 120 to flip between the front face 222 and back face 242 of handheld computer 220. The flex portion 110 may be formed from a tensile material such as leather, plastic, vinyl or rubber. The tensile properties of the flex portion enables, for example, cover portion 120 to flip between the front face 222 and the back face 242.

F. Examples and Alternative Embodiments

In an embodiment, core 114 of spine 105 is formed from steel. The thickness of core 114 is sufficient to enable spine 105 to flex lengthwise. The core 114 is clad with leather. The leather is stitched to flex portion 110. Preferably, flex portion 110 and cover portion 120 are also leather, and stitched, glued or other wise attached to one another.

While embodiments described thus far have referred to the accessory device as being an apparatus for providing a cover on the handheld computer 220, other embodiments may include components, circuits, and gadgets to extend functionality. For example, cover portion 120 may be equipped with folders and pockets, such as to provide for business cards and pens. The cover portion 120 may also include electronic components, such as global positioning components, radio-frequency antennas, and other circuitry. Examples of such accessory devices are disclosed in U.S. patent appl. Ser. No. 09/573,451, entitled "Electronic Encasement for a Handheld Computer", filed May 16, 2000, naming Lunsford et al. as inventors; U.S. patent appl. Ser. No. 09/586,541, entitled "Smart Cover for a Handheld Computer", filed May 31, 2000, naming Canova, Jr. et al. as inventors; U.S. patent appl. Ser. No. 09/451,630, entitled "Cover for a Handheld Computer", filed Nov. 30, 1999, naming Han et al. as inventors;

U.S. patent appl. Ser. No. 09/502,169, entitled "Encasement for Handheld Computer", filed Feb. 11, 2000, naming Canova, Jr. et al. as inventors; U.S. patent appl. No. 09/572,673, entitled "Keyboard for a Handheld Computer", filed May 16, 2000, naming Lunsford et al. as inventors; all of which are hereby incorporated by reference.

Another embodiment of the invention includes a stylus housed with the handheld computer. The stylus may be equipped with features of spine 105, in a manner described with embodiments of the invention. In a specific embodiment, a stylus includes an elongated member having a length and a cross-section. The cross-section permits the stylus to engage the device slot. The length enables the stylus to be received and retained within the slot. A majority of the length of the elongated member may include a deformable layer. As used herein, majority refers to an amount greater than 50% of the whole. The deformable layer deforms when the stylus engages the slot to retain the stylus within the slot.

In another embodiment, cover portion 120 extends from spine 105 without a flex member 110. The cover portion 120 may be moveable within device slot 212 to enable cover portion 120 to move between the front face 222 and the back face 224 of handheld computer 100.

In still another embodiment, spine 105 may comprise the accessory device, or alternatively form a detachable connection for other components. For example, the spine 105 may have a connection to couple to different types of other devices in a modular fashion.

G. Conclusion

The foregoing description of various embodiments of the invention has been presented for purposes of illustration and description. It is not intended to limit the invention to the precise forms disclosed. Many modifications and equivalent arrangements will be apparent.

What is claimed is:

1. An attachment mechanism for coupling an external device to a handheld computer, the attachment mechanism comprising:
   a spine adapted to detachably couple to a slot of the handheld computer, the spine including a deformable layer that deforms to enable the spine to insert and be retained within the slot.

2. The attachment mechanism of claim 1, wherein the deformable layer inserts to be biasely retained within the slot.

3. The attachment mechanism of claim 1, wherein the spine comprises a core member that is clad by the deformable layer.

4. The attachment mechanism of claim 3, wherein the core member is flexible about a length of the rigid member.

5. The attachment mechanism of claim 1, further comprising an enlarged end piece extending from the spine.

6. The attachment mechanism of claim 5, wherein the enlarged end piece is formed from a molded material.

7. The attachment mechanism of claim 1, wherein the deformable layer is configured to deform in a first direction, the first direction being orthanormal to a second direction corresponding to a length of the spine.

8. The attachment mechanism of claim 7, wherein the spine includes a thickness measured along the first direction, the thickness being sufficient to include an extension extending to a body of the attachment mechanism.

9. The attachment mechanism of claim 8, wherein the spine is oriented to engage the slot in the second direction.

10. An external device for a handheld computer, the external device comprising:
    a spine adapted to detachably couple to a slot of the handheld computer, the spine including a deformable layer that deforms to insert into the slot so as to couple the external device to the handheld computer; and
    a body that extends from the spine.

11. The external device of claim 10, wherein the body includes:
    a flex member extending from the spine; and
    a cover portion extending from the flex member.

12. The external device of claim 11, wherein the cover portion is dimensioned to cover a display of the handheld computer when the spine is coupled to the handheld computer.

13. The external device of claim 11, wherein the spine includes a core member, wherein the deformable layer is formed over the core member.

14. The external device of claim 13, wherein the core member is formed from a metal, and is flexible about a length of the core member.

15. The external device of claim 14, wherein the cover portion is formed from a tensile material.

16. The external device of claim 15, wherein the cover portion is formed from a leather material.

17. The external device of claim 15, wherein the cover portion is formed from a fabric.

18. The external device of claim 14, wherein the cover portion is formed from a material selected from metal, plastic, vinyl, and rubber.

19. The external device of claim 14, wherein the cover is formed from neoprene.

20. The external device of claim 14, wherein the cover portion is formed from a rigid material.

21. The external device of claim 10, wherein the deformable layer is dimensioned so that at least a portion of the deformable layer relaxes within the slot when the spine is inserted into the slot.

22. A detachable assembly comprising:
    a handheld computer including a front face, a back face opposing the front face, a top and a bottom, first lateral side and a second lateral side, the handheld computer including a display positioned to be accessible from the front face and extending between the top and bottom, and an accessory slot extending lengthwise on or adjacent to the first lateral sides; and
    an external device including a spine that engages the accessory slot to couple the external device to the handheld computer, the spine including a deformable layer that deforms to enable the spine to insert and be retained within the accessory slot.

23. The detachable assembly of claim 22, wherein the deformable layer deforms to enable the spine to be biasely retained within the accessory slot.

24. The detachable assembly of claim 22, wherein the accessory slot extends along a portion of a length of the handheld computer.

25. The detachable assembly of claim 22, wherein the deformable layer is formed from leather.

26. The detachable assembly of claim 22, wherein the spine includes a bottom end piece and a top end piece, the top end piece being enlarged relative to the bottom end piece, and wherein the spine further includes a member extending between the bottom end piece and the top end piece, the member including the deformable layer.

27. The detachable assembly of claim 26, wherein the member includes a core that is clad by the deformable layer.

28. The detachable assembly of claim 26, wherein the core is shaped so that a width of the core is greater than a thickness of the core, wherein the width of the core member is oriented to extend inward into the handheld computer when the external device couples to the spine.

29. The detachable assembly of claim 26, wherein the accessory slot includes an entrance recess positioned on the lateral side a distance away from the top of the handheld computer, the entrance recess being shaped to receive the spine from an end of the spine first.

30. The detachable assembly of claim 29, wherein the spine is insertable into the accessory slot from the bottom end piece, and the top end piece positions at least partially in the entrance recess when the spine is inserted into the accessory slot.

31. The detachable assembly of claim 22, wherein the accessory slot extends a depth into a casing of the handheld computer from the first lateral side.

32. The detachable assembly of claim 31, wherein the handheld computer further includes a second accessory slot positioned on or adjacent to the second lateral side of the handheld computer.

33. The detachable assembly of claim 31, wherein the second accessory slot includes an entrance opening that is engageable from the top of the handheld computer.

34. The detachable assembly of claim 22, wherein the deformable layer and accessory slot are each dimensioned so that at least a portion of the deformable layer relaxes after being inserted into the accessory slot.

35. An external device coupleable to a handheld computer, the external device comprising:

a spine dimensioned to be received within a slot of a handheld computer, a deformable layer retained on at least a portion the spine, the deformable layer deforming when the spine is inserted into the slot of the handheld computer to retain at least a portion of the spine within the slot.

36. The external device of claim 35, wherein the deformable layer extends a majority of a length of the spine.

37. The external device of claim 25, further comprising a body extending from the spine to be moveable over a display of the handheld computer when the spine is inserted into the slot of the handheld computer.

38. An external device coupleable to a handheld computer, the external device comprising:

a spine dimensioned to be received within a slot of a handheld computer, and a frictional contact surface formed continuously on at least a majority of the spine;

wherein the spine is dimensioned to slide within the slot of the handheld computer with the frictional contact surface contacting an interior surface of the slot so as to resist withdrawal of the spine from the slot.

39. The external device of claim 38, further comprising a body extending from the spine to be moveable over a display of the handheld computer when the spine is inserted into the slot of the handheld computer.

40. The external device of claim 38, wherein the spine has a rectangular cross-section.

41. The external device of claim 39, wherein the spine and the body form a T-shaped cross-section.

42. The external device of claim 38, wherein the frictional contact surface is deformable.

43. A stylus for use with a handheld computer, the stylus comprising:

an elongated member having a length and a cross-section, the elongated member being dimensioned to engage and be received within a slot of the handheld computer;

a core of the elongated member extending a majority of the length and forming part of the cross-section; and a deformable layer formed continuously about the core along the majority of the length of the elongated members the deformable layer deforming when the stylus engages the slot to retain the stylus within the slot.

* * * * *